United States Patent
Oh et al.

(10) Patent No.: US 9,841,452 B2
(45) Date of Patent: Dec. 12, 2017

(54) EARPHONE CONNECTION INTERFACE AND METHOD OF OPERATING EARPHONE, AND TERMINAL FOR SUPPORTING THE SAME

(71) Applicant: Samsung Electronics Co. Ltd., Suwon-si, Gyeonggi-do (KR)

(72) Inventors: Minwoo Oh, Hwaseong-si (KR); Jungmin Yang, Suwon-si (KR); Byounghee Lee, Suwon-si (KR); Jaekyu Lee, Suwon-si (KR); Hwanho Lee, Gumi-si (KR); Suho Jo, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 628 days.

(21) Appl. No.: 13/956,861

(22) Filed: Aug. 1, 2013

(65) Prior Publication Data

US 2014/0055167 A1    Feb. 27, 2014

(30) Foreign Application Priority Data

Aug. 23, 2012  (KR) .................. 10-2012-0092142

(51) Int. Cl.
*H04R 1/10* (2006.01)
*G01R 31/02* (2006.01)
*H04M 1/02* (2006.01)
*H04M 1/60* (2006.01)

(52) U.S. Cl.
CPC ........ *G01R 31/024* (2013.01); *H04M 1/0274* (2013.01); *H04M 1/6058* (2013.01); *H04R 2420/05* (2013.01)

(58) Field of Classification Search
CPC ............. G01R 31/024; H04M 1/0274; H04M 1/6058; H04M 1/72527; H04R 2420/05; H04R 2420/09
See application file for complete search history.

(56) References Cited

U.S. PATENT DOCUMENTS

| 7,361,061 | B2 | 4/2008 | Kim | |
| 8,180,397 | B2 * | 5/2012 | Stenmark | H04M 1/72527 455/557 |
| 8,620,004 | B2 * | 12/2013 | Wu | H04M 1/6058 381/74 |
| 9,060,228 | B2 * | 6/2015 | Lee | H04R 29/004 |
| 9,103,866 | B2 * | 8/2015 | Mehrabi | G01R 31/04 |
| 9,124,709 | B2 * | 9/2015 | Lee | H01R 24/58 |
| 9,332,350 | B2 | 5/2016 | Sun et al. | |

(Continued)

FOREIGN PATENT DOCUMENTS

| CN | 1790832 A | 6/2006 |
| CN | 101489159 A | 7/2009 |

(Continued)

*Primary Examiner* — Duc Nguyen
*Assistant Examiner* — Kile Blair
(74) *Attorney, Agent, or Firm* — Jefferson IP Law, LLP

(57) ABSTRACT

An earphone connection interface is provided. The earphone connection interface includes a first detector disposed at a first area to detect an electrical change according to a contact state of the first area, and a second detector disposed at a second area different from the first area to detect an electrical change according to a contact state of the second area.

20 Claims, 11 Drawing Sheets

(56) References Cited

U.S. PATENT DOCUMENTS

| | | |
|---|---|---|
| 2004/0081099 A1 | 4/2004 | Patterson et al. |
| 2004/0101144 A1* | 5/2004 | Lee .................. G06F 3/162 |
| | | 381/58 |
| 2009/0130910 A1 | 5/2009 | Inha et al. |
| 2009/0179768 A1 | 7/2009 | Sander et al. |
| 2009/0179789 A1 | 7/2009 | Haughay, Jr. et al. |
| 2011/0085673 A1 | 4/2011 | Lee |
| 2011/0098085 A1 | 4/2011 | Stenmark et al. |
| 2011/0237131 A1* | 9/2011 | Fields .............. H01R 13/7039 |
| | | 439/620.21 |

FOREIGN PATENT DOCUMENTS

| | | |
|---|---|---|
| CN | 101778319 A | 7/2010 |
| CN | 201789630 U | 4/2011 |
| CN | 102045620 A | 5/2011 |
| CN | 102158779 A | 8/2011 |
| EP | 2 312 813 A1 | 4/2011 |
| KR | 10-2011-0040359 A | 4/2011 |

\* cited by examiner

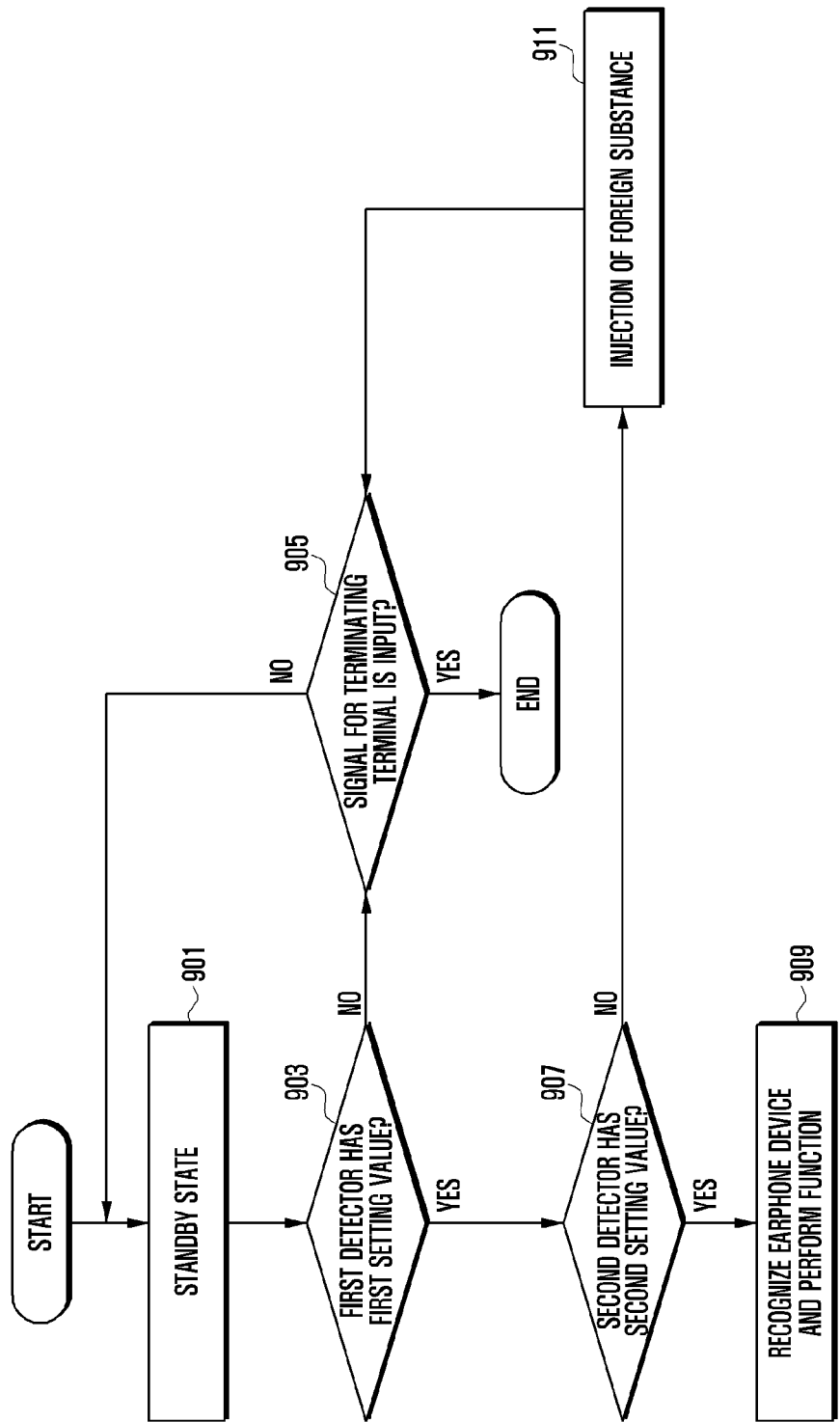

EARPHONE CONNECTION INTERFACE AND METHOD OF OPERATING EARPHONE, AND TERMINAL FOR SUPPORTING THE SAME

PRIORITY

This application claims the benefit under 35 U.S.C. §119(a) of a Korean patent application filed on Aug. 23, 2012 in the Korean Intellectual Property Office and assigned Serial No. 10-2012-0092142, the entire disclosure of which is hereby incorporated by reference.

BACKGROUND OF THE INVENTION

1. Field of the Invention

The present invention relates to operation of an earphone connection interface. More particularly, the present invention relates to an earphone connection interface, a method of operating an earphone, and a terminal for supporting the same.

2. Description of the Related Art

Nowadays, mobile terminals are widely used due to their mobility. That is, because a mobile communication terminal can perform audio dedicated communication while moving, it has become a very popular device that is used by most people. The mobile communication terminal may have various functions while providing a function of transmitting and receiving communication information between speakers as a major function. For example, a mobile terminal of the related art may have an MP3 function corresponding to a file reproduction function and an image collection function corresponding to a digital camera that can collect an image. Further, a mobile terminal of the related art has a function that can perform a mobile game or an arcade game.

In order not to disturb another person in an audio output process or in order for a user to enjoy listening to audio alone, a mobile terminal of the related art provides an earphone system. Accordingly, the user can listen to music or broadcasting regardless of a time or a place by using an earphone device. Here, as a plug of an earphone device is inserted into a cylindrical hole-shaped earphone connection interface of a terminal, an earphone system of the related art adapts a system in which the terminal senses connection of an earphone. More particularly, as a plug tip portion of an earphone device contacts with the bottom of the inside of the earphone connection interface of the terminal, the earphone system of the related art is designed to detect connection of the earphone device.

When a problem does not exist at the inside of an earphone connection interface, earphone system of the related art having the above-described structure normally operates an earphone device. However, when a foreign substance is located in the earphone connection interface, a problem occurs in an electrical connection relationship of the earphone connection interface and thus an erroneous operation may occur in a terminal. More particularly, when a material, for example water containing an electrolyte that can perform an electrical connection is injected into an earphone connection interface, water is pooled at the bottom of the inside of the earphone connection interface, and the water electrically connects terminals provided to recognize connection of an earphone device by performing an electrical passage function.

Therefore, even if the earphone device is not actually connected, the terminal senses that the earphone device is connected and supports an earphone device function. More particularly, when the earphone device is connected, if the terminal is designed to turn off a speaker function of the terminal, a problem that the terminal cannot be normally used occurs. Such a problem may occur when the earphone connection interface has an erroneous electrical characteristic due to corrosion after injection of water such as rainwater as well as injection of a material such as seawater into the earphone connection interface.

Thus, a need exists for an improved earphone connection interface.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an earphone connection interface, a method of operating an earphone, and a terminal for supporting the same that can detect a normal connection of an earphone device and perform a normal earphone function according to the connection, even if a foreign substance is located in the earphone connection interface.

In accordance with an aspect of the present invention, an earphone connection interface is provided. The earphone includes a first detector disposed at a first area to detect an electrical change according to a contact state of the first area, and a second detector disposed at a second area different from the first area to detect an electrical change according to a contact state of the second area.

Here, the contact state may be at least one of a state in which the earphone plug is connected to the earphone connection interface or a foreign substance contact state according to injection of a foreign substance.

In accordance with another aspect of the present invention, a terminal is provided. The terminal includes an earphone connection interface in which at least two terminals for detecting an electrical change according to a contact state are disposed, and a controller for performing a function support according to an earphone device connection or a function support according to non-connection of an earphone device by detecting a signal change of two terminals of the earphone connection interface.

In accordance with another aspect of the present invention, a method of operating an earphone is provided. The method includes preparing an earphone connection interface including a first detector disposed at a first area to detect an electrical change according to a contact state and a second detector disposed at a second area different from the first area to detect an electrical change occurring when an earphone plug is inserted, and performing a function according to connection of an earphone device or performing a function according to non-connection of an earphone device according to a signal change of the first detector and the second detector.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 11 is a flowchart illustrating a method of operating an earphone according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
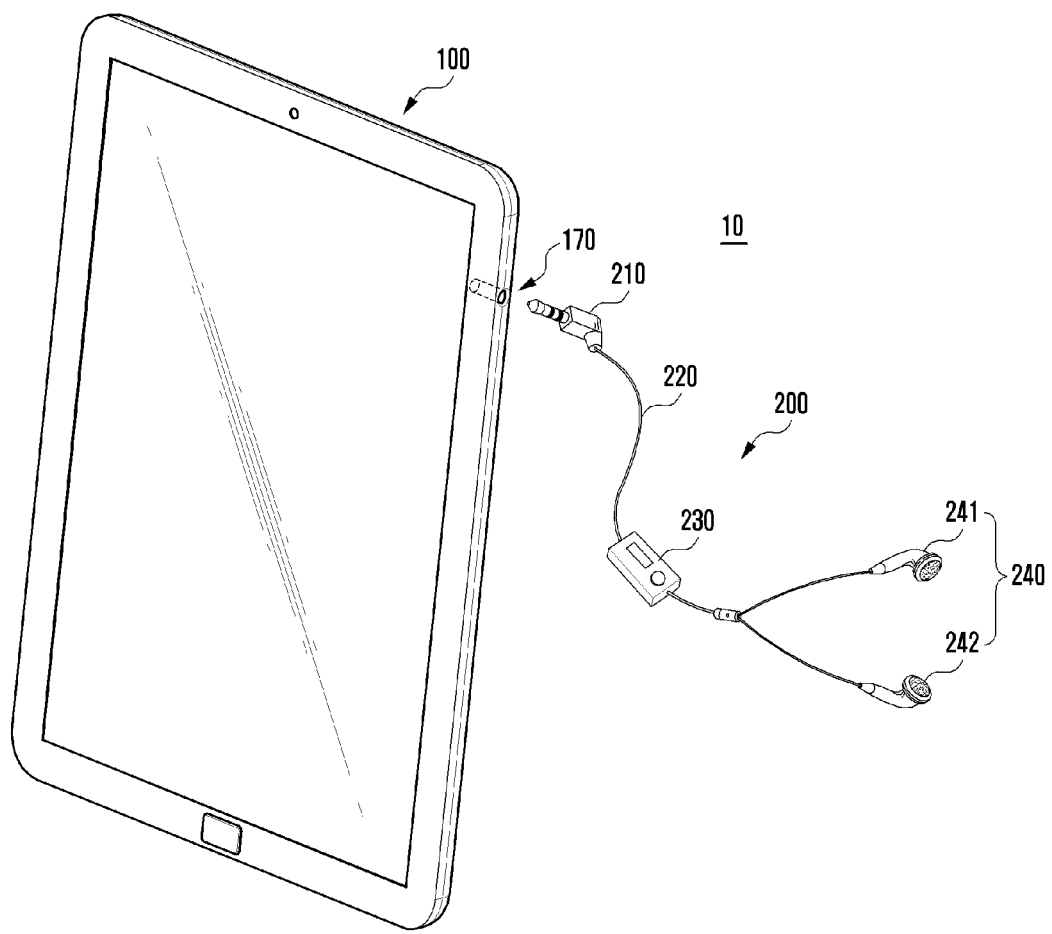
FIG. 1 is a perspective view illustrating a configuration of an earphone operation system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, in order to distinguish between injection of an earphone device and injection of a foreign substance, an exemplary earphone operation system of the present invention provides an earphone connection interface in which terminals for detecting contact of at least two terminals of terminals disposed at an earphone plug of the earphone device are disposed and a terminal including a controller for distinguishing connection of the earphone device or injection of a foreign substance by detecting a signal change of two terminals of the earphone connection interface.

Here, an exemplary earphone connection interface includes a first detector for detecting an electrical change caused by an injected foreign substance or a contact of a terminal disposed at a tip portion of the earphone plug in two terminals and a second detector for detecting a contact of another terminal of the earphone plug. Hereinafter, the first detector illustrates an earphone detection terminal, and the second detector includes a microphone terminal or a separately disposed ground detection terminal. However, the second detector is not limited thereto and may be at least one of additionally provided specific terminals according to other terminals disposed at an earphone connection interface or a designer's intention. Hereinafter, a terminal contact state of an earphone connection interface may include at least one of a contact between an earphone plug and terminals of the earphone connection interface and a contact between a foreign substance and terminals of the earphone connection interface.

Figure 2:
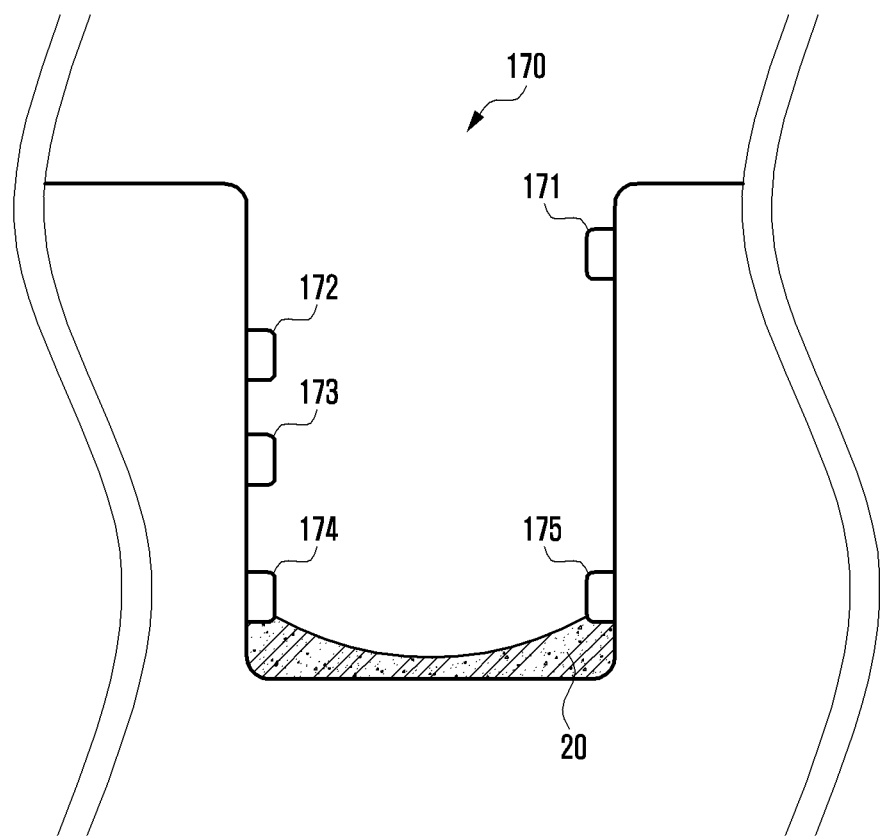
FIG. 2 is a diagram illustrating a configuration of an earphone connection interface of a terminal in the configuration of the earphone operation system of FIG. 1 according to an exemplary embodiment of the present invention.
Figure 3:
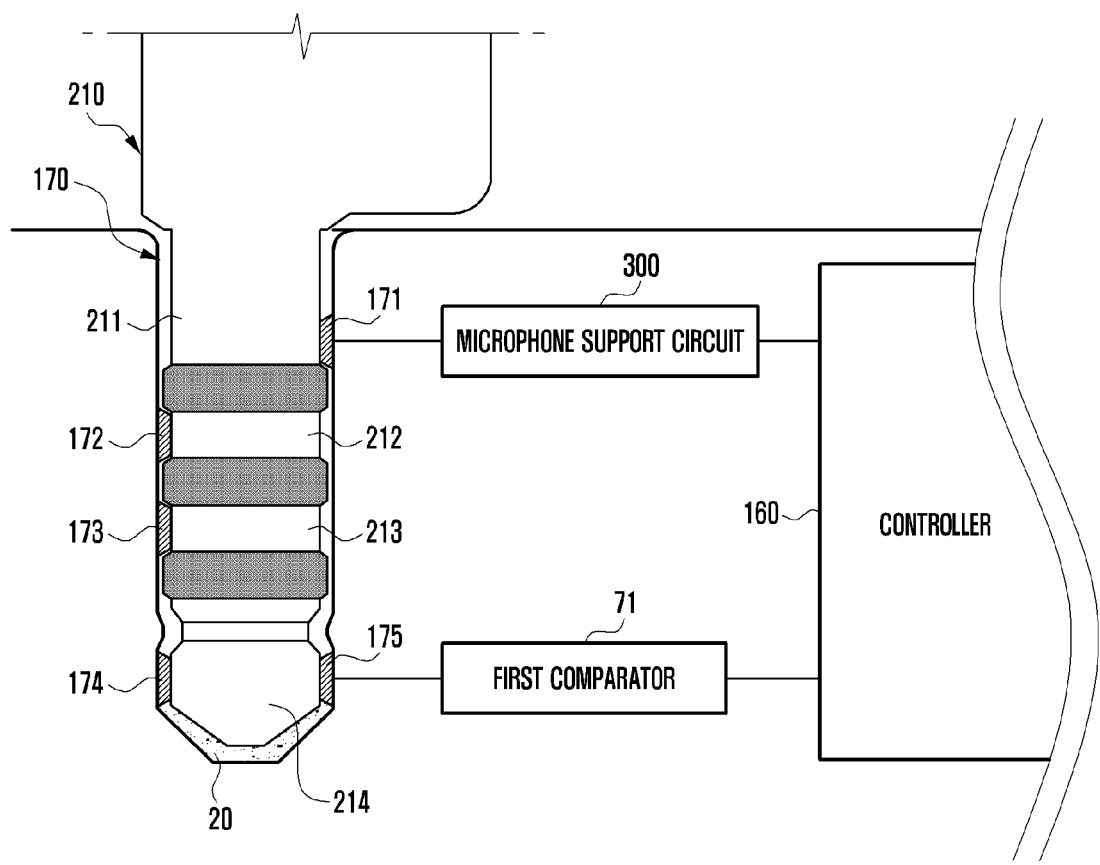
FIG. 3 is a circuit diagram illustrating a state in which an earphone plug is inserted into the earphone connection interface of FIG. 2 according to an exemplary embodiment of the present invention.

FIG. 1 is a perspective view illustrating a configuration of an earphone operation system according to an exemplary embodiment of the present invention, FIG. 2 is a diagram illustrating a configuration of an earphone connection interface of a terminal in the configuration of the earphone operation system of FIG. 1 according to an exemplary embodiment of the present invention, and FIG. 3 is a circuit diagram illustrating a state in which an earphone plug is inserted into the earphone connection interface of FIG. 2 according to an exemplary embodiment of the present invention.

Referring to FIGS. 1 to 3, an earphone operation system 10 includes a terminal 100 and an earphone device 200.

In the earphone operation system 10, when an earphone plug 210 of the earphone device 200 is inserted into an earphone connection interface 170 of the terminal 100, a controller 160 of the terminal 100 recognizes the inserted earphone plug 210 and supports an earphone function. When a foreign substance 20 is injected into or is otherwise located in the earphone connection interface 170, the earphone operation system 10 recognizes that the earphone device 200 is in a non-connection state and enables the terminal 100 not to perform a separate earphone function. Accordingly, by enabling the terminal 100 to distinguish in a case where the earphone device 200 is inserted or in a case where the foreign substance 20 is injected, the earphone operation system 10 can perform a normal terminal function according to insertion or no insertion of the earphone device 200.

As shown in FIG. 1, the earphone device 200 includes the cylindrical earphone plug 210, a signal line 220 connected to the earphone plug 210, and an earphone output unit 240 disposed at an end portion of the signal line 220. The earphone output unit 240 includes an earphone left output unit 241 and an earphone right output unit 242. The earphone device 200 may include a 3-way or a 4-way device according to whether a microphone is supported. In the 4-way earphone device in which the microphone is supported, a microphone module 230 is disposed in the signal line 220. In the 3-way earphone device, a microphone module is excluded. In the earphone device 200, earphone plugs of the 4-way earphone device and the 3-way earphone device may be differently formed. That is, the earphone plug 210 of the 4-way earphone device is provided in a form having 4 poles, and the earphone plug 210 of the 3-way earphone device is provided in a form having 3 poles. The earphone operation system 10 distinguishes injection of the foreign substance 20 and connection of the earphone device 200 regardless of 3 poles or 4 poles of the earphone device 200.

The terminal 100 provides the earphone connection interface 170 in which the earphone plug 210 of the earphone device 200 may be inserted at one side of a side surface or a specific position according to a designer's intention and supports an earphone function according to insertion of the earphone device 200. When the earphone function is supported, the terminal 100 turns off a speaker function provided in the terminal 100 according to a design method and outputs an audio signal generated in the terminal 100 through the earphone device 200. Further, when an earphone function is supported, the terminal 100 turns off a microphone function of the terminal according to the number of poles of the connected earphone device 200 and supports a microphone function of the earphone device 200. Here, when a 3-way earphone device having no microphone module is inserted, the terminal 100 is selectively operated according to a user function that activates a microphone function of the terminal 100.

When the earphone plug 210 is inserted into the earphone connection interface 170, the earphone connection interface 170 may be in a state shown in FIG. 3. In more detail, an earphone left terminal 214, earphone right terminal 213, earphone ground terminal 212, and earphone microphone terminal 211 of the earphone plug 210 are connected to a terminal left terminal 174, terminal right terminal 173, terminal ground terminal 172, and terminal microphone terminal 171, respectively of the earphone connection interface 170. Positions of terminals of the earphone connection interface 170 may be differently designed according to a type of an earphone device, for example, terminals of the earphone plug 210 may be disposed in order of a tip portion of a protruded plug, earphone left terminal, earphone right terminal, earphone microphone terminal, and earphone ground terminal. Accordingly, the earphone connection interface 170 may be disposed in order of the bottom of a hole, the terminal left terminal, terminal right terminal, terminal microphone terminal, and terminal ground terminal.

Further, the earphone left terminal 214 of the earphone plug 210 is electrically connected to an earphone detection terminal 175 provided in the earphone connection interface 170. Here, the earphone detection terminal 175 is connected to a first comparator 71, and the first comparator 71 is connected to the controller 160 or is connected to the controller 160 through a General Purpose Input Output (GPIO) port. The terminal microphone terminal 171 is connected to the controller 160 through a microphone support circuit 300. The earphone operation system 10 having such a structure may distinguish an injection state of the foreign substance 20 and a connection state of the earphone device 200 into which the foreign substance 20 is injected by comparing a detection value of the first comparator 71 and a detection value of the microphone support circuit 300.

For example, when the earphone device 200 is not connected, the controller 160 of the earphone operation system 10 collects a voltage level formed in connection of the terminal left terminal 174, the foreign substance 20, and the earphone detection terminal 175 and collects a voltage level according to an opened state of the terminal microphone terminal 171. Further, when the earphone device 200 is connected, the controller 160 of the earphone operation system 10 collects a voltage level formed between the terminal left terminal 174, the foreign substance 20, and the earphone detection terminal 175 and collects a voltage level formed according to connection of the terminal microphone terminal 171 and the earphone microphone terminal 211. Accordingly, the controller 160 distinguishes a connection of the earphone device 200 regardless of the foreign substance 20 according to a voltage level of the terminal microphone terminal 171.

In the earphone connection interface 170 having the above-described structure, when an Ear_ADC port voltage level for detecting a voltage formed in a terminal microphone terminal provided in the microphone support circuit 300 is designed to monitor in real time, the controller 160 controls to distinguish injection of the foreign substance 20 and controls to perform a function according to the insertion in a software method. In more detail, when a voltage state of an earphone detection port EAR_Det is changed, the controller 160 determines as insertion of the earphone device 200 or insertion of the foreign substance 20. In this case, when an Ear_ADC voltage level is smaller than a voltage of an ear microphone bias voltage source provided to operate the microphone module 230 of the earphone device 200, the controller 160 recognizes as a normal insertion state of the earphone device 200 and controls to perform a function according to the insertion (i.e., a function according to insertion of the earphone device 200), for example to convert an audio signal path to the earphone connection interface 170.

When an Ear_ADC voltage level is the same as a voltage of an ear microphone bias voltage source, the earphone device 200 is in a state in which the foreign substance 20 is injected, and thus the controller 160 determines that the earphone device 200 is not inserted, does not support an earphone function, and controls to perform a function according to non-insertion of the earphone device 200. That is, the controller 160 controls to perform at least one of collection and output of an audio signal through a speaker and a microphone provided in the terminal 100.

After the earphone device 200 is inserted, when a voltage state of the EAR_Det is changed, the controller 160 determines the change as a release of the insertion of the earphone device 200. Therefore, the controller 160 controls a terminal function according to release of insertion of the earphone device 200. While a voltage state of the EAR_Det is maintained, when an EAR_ADC value is changed, the controller 160 recognizes this as a case where the earphone device 200 is removed after the earphone device 200 is inserted in a state in which the foreign substance 20 is injected. Accordingly, when an Ear_ADC voltage level is the same as a voltage of the ear microphone bias voltage source, the controller 160 recognizes this as a removal state of the earphone device 200 in a state in which a foreign substance is injected.

When the earphone device 200 is removed, the controller 160 stops supply of an ear microphone bias voltage and restores setting of the speaker and the microphone of the terminal 100 to setting of a state before the earphone device 200 is inserted.

Figure 4:
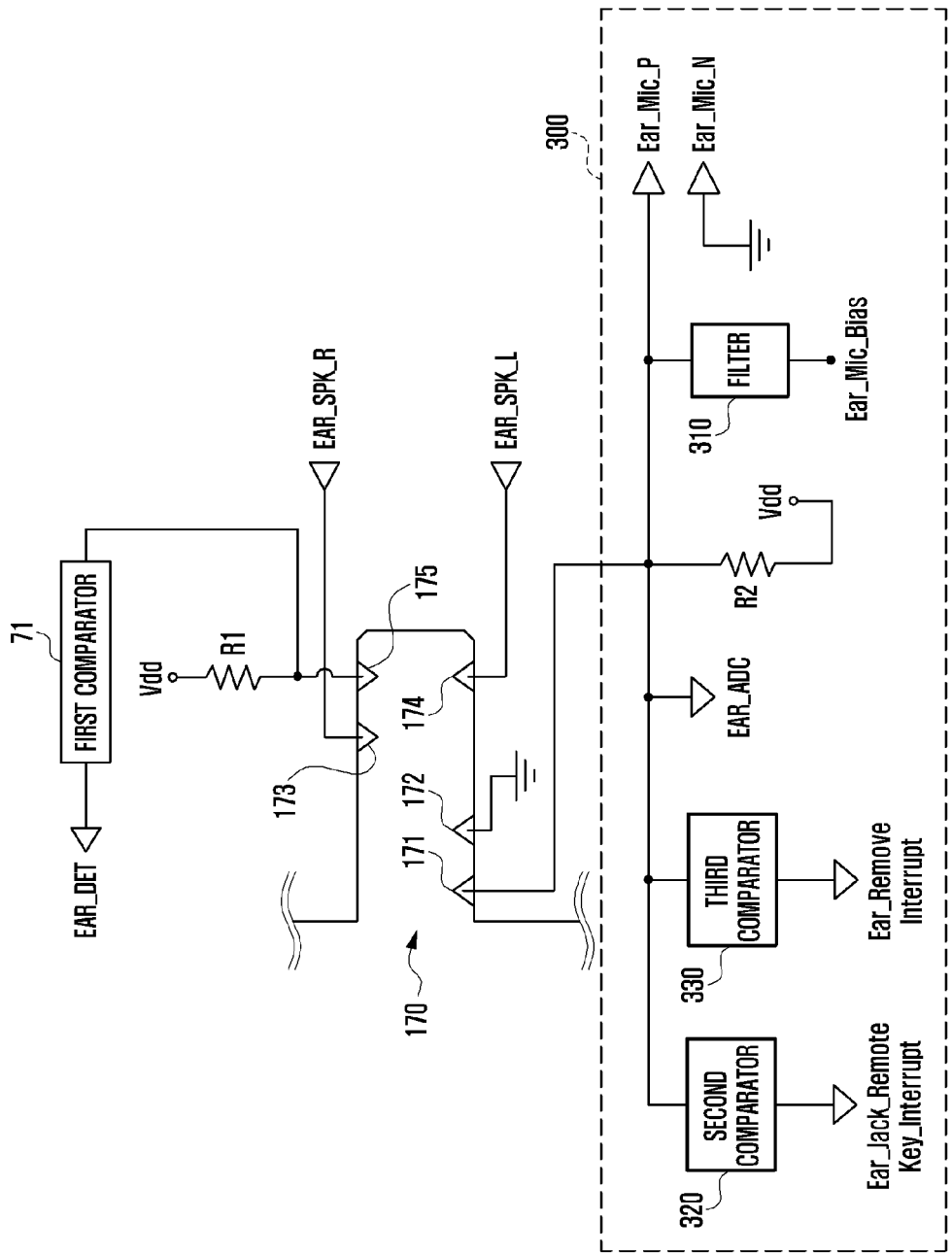
FIG. 4 is a circuit diagram illustrating an earphone connection interface according to a first exemplary embodiment of the present invention.

When the terminal is designed not to monitor the Ear_ADC voltage level in real time, the controller 160 recognizes the earphone device 200 based on a disposition of a hardware comparator, as shown in FIG. 4.

FIG. 4 is a circuit diagram illustrating an earphone connection interface according to a first exemplary embodiment of the present exemplary embodiment.

Referring to FIG. 4, the earphone connection interface 170 is provided in a form in which the terminal microphone terminal 171, the terminal ground terminal 172, the terminal left terminal 174, and the terminal right terminal 173 are protruded from a cylindrical groove inner wall. The earphone detection terminal 175 is disposed at a position aligned on the same line as that of the terminal left terminal 174 to equally contact with the earphone left terminal 214 contacting with the terminal left terminal 174 in a connection process of the earphone device 200. The terminal left terminal 174 is disposed at the bottom of the inside of a groove provided to the earphone connection interface 170, and the earphone detection terminal 175 is disposed at the bottom of the inside of a groove of the earphone connection interface 170. Accordingly, when the foreign substance 20 having an electrolytic characteristic is injected and pooled, the foreign substance 20 is generally pooled at the bottom of the inside of the earphone connection interface 170 and thus electrically connects the earphone detection terminal 175 and the terminal left terminal 174. The terminal ground terminal 172 is connected to the earphone ground terminal 212 of the earphone device 200 connected to the earphone connection interface 170 to perform a ground function of the earphone device 200.

The terminal right terminal 173 is connected to an earphone right port EAR_SPK_R of the controller 160 to transfer an earphone right side signal according to the control of the controller 160. Such a terminal right terminal 173 is electrically connected to the earphone right terminal 213 of the inserted earphone device 200. Therefore, an earphone right side signal output by the controller 160 is output to the earphone right output unit 242 through the terminal right terminal 173 and the earphone right terminal 213.

The terminal left terminal 174 is connected to an earphone left port EAR_SPK_L of the controller 160, and an earphone left side signal provided by the controller 160 is transferred to the terminal left terminal 174. Such a terminal left terminal 174 forms a path including the earphone left terminal 214 and the earphone left output unit 241 of the inserted earphone device 200 and performs a transfer passage function of the earphone left side signal. More particularly, an output of the first comparator 71, according to an electrical change by the earphone device 200 or the foreign substance 20 contacting with the terminal left terminal 174, may be transferred to the EAR_SPK_L.

The earphone detection terminal 175 is connected to the EAR_Det of the controller 160. Such an earphone detection terminal 175 is connected to the first comparator 71 that provides an electrical signal change according to insertion of the earphone device 200 or injection of the foreign substance 20. A pull-up voltage Vdd in which a first pull-up resistor R1 is connected is provided to the earphone detection terminal 175. The pull-up voltage Vdd connected to the first pull-up resistor R1 is disposed as an input voltage of the first comparator 71. As the earphone plug 210 contacts with the earphone detection terminal 175, a pull-up voltage Vdd has a voltage change and thus an input voltage of the first comparator 71 changes and an output of the first comparator 71 may be thus changed. When an output of the first comparator 71 is transferred through the EAR_Det, the controller 160 determines at least one of an insertion state of the earphone device 200 or an injection state of the foreign substance 20 through an output change of the first comparator 71.

The terminal microphone terminal 171 may be disposed in a form protruded from an outmost inner wall of a groove opening of the earphone connection interface 170. Accordingly, when the earphone device 200 is inserted into the earphone connection interface 170, the earphone device 200 electrically contacts with the earphone microphone terminal 211 provided at the inside of the earphone plug 210. The microphone support circuit 300 is disposed between the terminal microphone terminal 171 and the controller 160. The microphone support circuit 300 includes a signal line connected to an ear microphone P port Ear_Mic_P and an ear microphone N port Ear_Mic_N of the controller 160, a supply line to which a voltage of an ear microphone bias voltage source Ear_Mic_Bias is supplied, and a supply line in which a second pull-up resistor R2 is disposed to supply a pull-up voltage Vdd. Here, a pull-up voltage Vdd to which the second pull-up resistor R2 is connected provides a basic voltage state of signal lines included in the microphone support circuit 300.

A filter 310 is disposed between the Ear_Mic_Bias and the terminal microphone terminal 171. The filter 310 performs a function of removing noise injected into the microphone support circuit 300. When the 4-way earphone device 200 is connected to the terminal microphone terminal 171, the Ear_Mic_Bias has a configuration that provides predetermined power in order to support a microphone function of the earphone device 200.

The microphone support circuit 300 includes a signal line connected to the Ear_ADC port of the controller 160, a signal line connected to an earphone removal detection port Ear_Remove_Interrupt of the controller 160, and a signal line connected to an ear jack key interrupt port Ear_Jack_Remote Key_of the controller 160. A second comparator 320 is disposed between the Ear_Remove_Interrupt and the terminal microphone terminal 171, and a third comparator 330 is disposed between the Ear_Jack_Remote Key_Interrupt and the terminal microphone terminal 171.

The second comparator 320 of the microphone support circuit 300 receives a pull-up voltage Vdd to which the second pull-up resistor R2 is connected as an input voltage before the earphone device 200 is inserted, and when a voltage is changed according to operation of signal keys provided to a microphone module of the 4-way earphone device 200, the second comparator 320 transfers an output according to a changed voltage to the Ear_Jack_Remote Key_Interrupt.

More particularly, in the microphone support circuit 300, in order to determine an electrical change according to release of the earphone device 200, the third comparator 330 is connected to the Ear_Remove_Interrupt. When the earphone device 200 is inserted, in a state in which a voltage of the terminal microphone terminal 171 is provided, the earphone microphone terminal 211 and the terminal microphone terminal 171 are disconnected according to removal of the earphone device 200, and the third comparator 330 transfers a value corresponding to an electrical change thereof to the Ear_Remove_Interrupt. The controller 160 controls to stop voltage supply of the Ear_Mic_Bias according to a signal change received to the Ear_Remove_Interrupt.

Each port may be directly connected to the controller 160. Also, but for various objections such as port distribution of the controller 160, each port may be connected to the controller 160 through a GPIO port.

Figure 5:
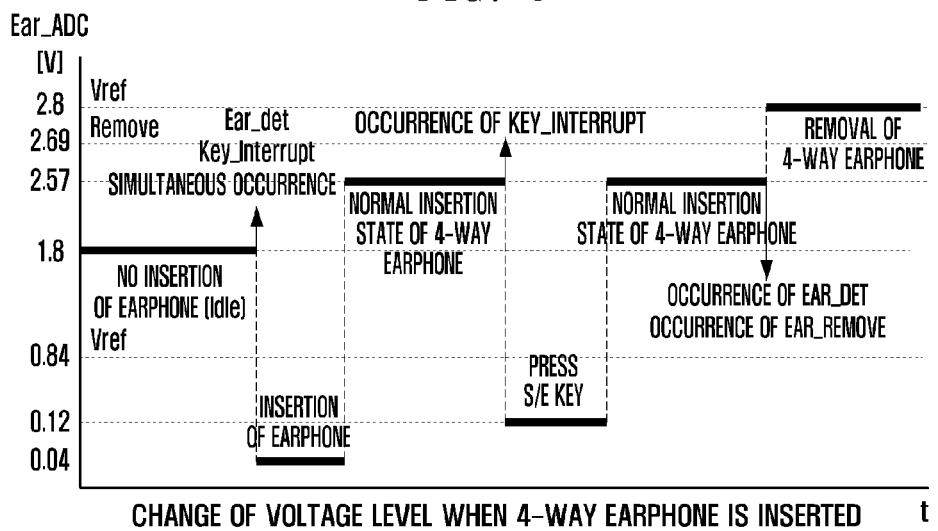
FIG. 5 is a graph illustrating a state change of the earphone connection interface of FIG. 4 according to an exemplary embodiment of the present invention.
Figure 5:
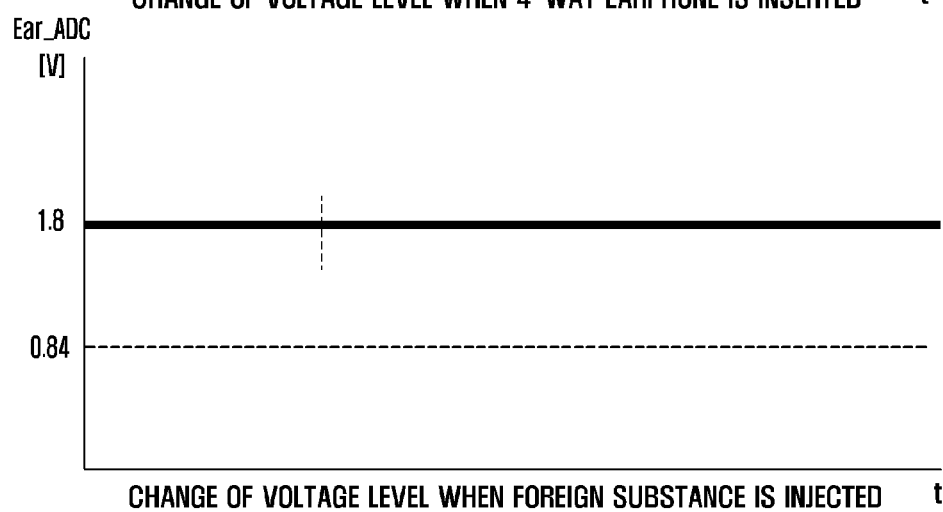
Figure 5:
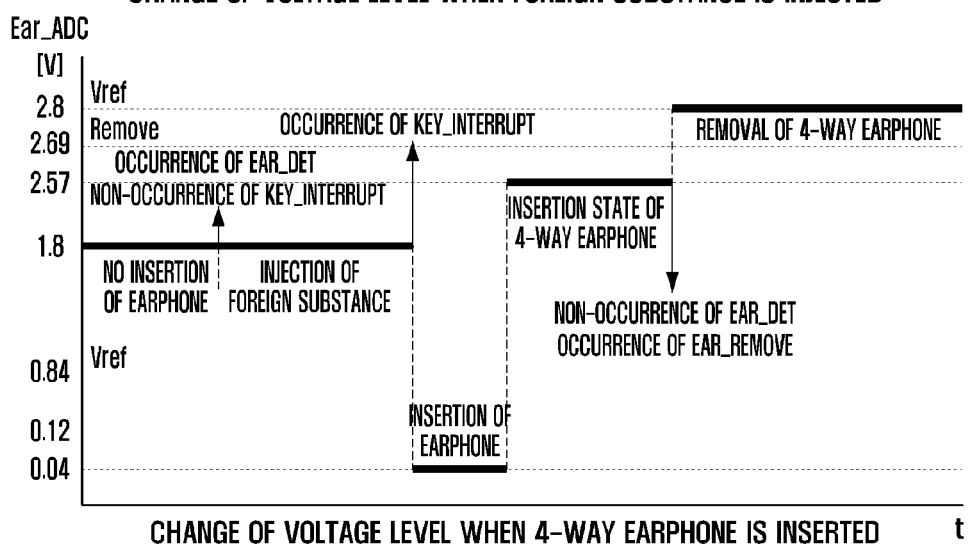

FIG. 5 is a graph illustrating a state change of the earphone connection interface of FIG. 4 according to an exemplary embodiment of the present invention.

Referring to FIG. 5, a first change graph illustrates a voltage change according to insertion of the 4-way earphone device 200 in a normal state in which the foreign substance 20 is not injected. As shown in the first change graph, in a state in which the earphone device 200 is not inserted, the pull-up voltage Vdd connected to the second pull-up resistor R2 may be provided as a voltage of the terminal microphone terminal 171. In this case, it is assumed that a magnitude of the pull-up voltage Vdd connected to the second pull-up resistor R2 is 1.8V. Accordingly, in a state in which the earphone device 200 is not inserted, at the Ear_ADC port of the controller 160, 1.8V is detected.

When the earphone device 200 is connected to the earphone connection interface 170, the earphone plug 210 contacts with the terminal ground terminal 172 among the terminal microphone terminal 171, the terminal ground terminal 172, the terminal right terminal 173, and the terminal left terminal 174 that are disposed at the earphone connection interface 170 and thus the earphone plug 210 drops to a lowest voltage. Here, it is assumed that a lowest voltage is 0.04V. Thereafter, when the earphone device 200 is normally inserted into the earphone connection interface 170 and the earphone left terminal 214 of the earphone plug 210 contacts with the earphone detection terminal 175 of the terminal 100, an output of the first comparator 71 connected to the earphone detection terminal 175 is changed, and the output change is transferred to the EAR_Det.

Further, as the earphone device 200 is normally inserted, when the earphone microphone terminal 211 contacts with the terminal microphone terminal 171, the controller 160 recognizes a change of the Ear_Jack_Remote Key_Interrupt and determines insertion of the earphone device 200. Here, in a state in which a reference voltage of the second comparator 320 connected to the Ear_Jack_Key_Interrupt is provided as 0.84V, an output of the second comparator 320 is changed according to a change of an input voltage of the second comparator 320. The Ear_Jack_Remote Key_Interrupt receives a voltage change of the second comparator 320 according to insertion of the earphone device 200.

When it is determined that the earphone device 200 is inserted through signal detection of the EAR_Det and the Ear_Jack_Key_Interrupt connected to the earphone detection terminal 175, the controller 160 controls to supply a voltage of the Ear_Mic_Bias to the earphone microphone terminal 211 through the terminal microphone terminal 171. Here, when a voltage of the Ear_Mic_Bias is assumed as 2.8V, a voltage applied to the terminal microphone terminal 171 is resultantly dropped by elements provided to the microphone module 230 to be, for example 2.57V. When the earphone device 200 is inserted into the earphone connection interface 170, a voltage of the Ear_Mic_Bias is continuously provided to operate the microphone module 230 of the earphone device 200. Finally, in a state in which the earphone device 200 is inserted into earphone connection interface, the terminal microphone terminal 171 maintains 2.57V.

When a specific button, for example a Send/End key of the microphone module 230 disposed at the earphone device 200 is pressed, a signal path provided to the microphone module 230 is converted, and a voltage is dropped by elements disposed at a corresponding path. That is, when a user activates a specific button of the microphone module 230, a voltage formed in the terminal microphone terminal 171 may be dropped to a predetermined voltage, for example 0.12V according to a voltage drop by a corresponding button. In this case, a voltage formed in the terminal microphone terminal 171 may be provided as an input voltage of the second comparator 320, and a signal transferred to the Ear_Jack_Remote Key_Interrupt of the controller 160 may be changed according to an input voltage change of the second comparator 320. Therefore, the controller 160 recognizes that a button of the microphone module 230 is pressed down according to a signal change transferred to the Ear_Jack_Remote Key_Interrupt. When pressing of the button of the microphone module 230 is released, a voltage of the Ear_Mic_Bias is supplied again to the terminal microphone terminal 171, and a voltage detected at the Ear_ADC port may be 2.57V according to normal insertion of the 4-way earphone.

When the earphone device 200 is removed from the earphone connection interface 170, the earphone left terminal 214 and the earphone detection terminal 175 are disconnected and thus an input voltage of the first comparator 71 may be changed. Therefore, an output according to an input voltage change of the first comparator 71 is transferred to the EAR_Det. Because a voltage drop element by the microphone module 230 is removed according to disconnection of the microphone module 230, the voltage of the Ear_Mic_Bias is provided without change.

Finally, a voltage formed in the terminal microphone terminal 171 is 2.8V, which is a voltage of the Ear_Mic_Bias. Such a voltage of the Ear_Mic_Bias or a voltage of the terminal microphone terminal 171 is provided as an input voltage of the third comparator 330. Here, when it assume that a reference voltage of the third comparator 330 is set as 2.68V, an input voltage of the third comparator 330 is changed from 2.57V to 2.8V and thus an output of the third comparator 330 is changed.

Here, a reference voltage of the third comparator 330 is determined by subtracting a voltage dropped by the microphone module 230 from a voltage of the Ear_Mic_Bias and by adding a value of ½ of a subtraction result and a voltage of the Ear_Mic_Bias dropped by the microphone module 230. For example, when it is assumed that a voltage of the Ear_Mic_Bias is A and a voltage of the Ear_Mic_Bias dropped by the microphone module 230 is B, a reference voltage of the third comparator 330 is determined by Equation 1.

$$\text{reference voltage of third comparator } 330 = B + \tfrac{1}{2}(A - B) \quad \text{Equation 1}$$

An output change of the third comparator 330 is transferred to an Ear_Remove_Interrupt. The controller 160 recognizes that the earphone device 200 is removed from the earphone connection interface 170 through a signal change of the EAR_Det and the Ear_Remove_Interrupt. Therefore, the controller 160 releases supply of a voltage of the Ear_Mic_Bias and controls to perform a function according to release of the earphone device 200, for example to activate or inactive at least one of a speaker function and a microphone function of a main body according to a user function performed in the terminal 100.

When the foreign substance 20 is injected into the earphone connection interface 170, an electrical connection passage is formed between the earphone detection terminal 175 and the terminal left terminal 174. Accordingly, an input voltage of the first comparator 71 of the EAR_Det is changed, and a converted output of the first comparator 71 is transferred to the EAR_Det. A pull-up voltage, for example, 1.8V to which the second pull-up resistor R2 is connected is provided to the terminal microphone terminal 171, and thus 1.8V is maintained at the Ear_ADC port, as shown in a second graph.

In a state in which the foreign substance 20 is injected, when the 4-way earphone device 200 is connected to the earphone connection interface 170, the controller 160 operates the earphone device 200 through a voltage change, as shown in a third graph. That is, in a state in which the earphone device 200 is not inserted, the controller 160 receives 1.8V to the Ear_ADC port according to supply of a pull-up voltage connected to the second pull-up resistor R2, and in a state in which the foreign substance 20 is injected, a detection of a voltage 1.8V is maintained.

When the earphone device 200 is inserted, a voltage of the earphone detection terminal 175 has been already changed by the foreign substance 20 and thus a signal change transferred to the Ear_Jack_Remote Key_Interrupt according to an input voltage change of the second comparator 320 may be detected. When a signal of the Ear_Jack_Remote Key_Interrupt is changed, the controller 160 recognizes this as insertion of the earphone device 200 and controls to supply a voltage of the Ear_Mic_Bias to the terminal microphone terminal 171.

Because the microphone module 230 connected to the earphone device 200 drops a voltage of the Ear_Mic_Bias, 2.57V may be detected at the Ear_ADC port. When a corresponding voltage is maintained, the controller 160 determines this as a normal insertion state of a 4-way earphone and controls to operate a function of the earphone device 200 according to this state. When the earphone device 200 is removed from the earphone connection interface 170, a voltage of the EAR_Det is not changed, and a voltage of the Ear_Remove_Interrupt is changed according to an input voltage change of the third comparator 330. When a voltage of the Ear_Remove_Interrupt is changed, the controller 160 determines this as release of insertion of the earphone device 200 and controls to stop voltage supply of the Ear_Mic_Bias.

As described above, the earphone connection interface 170 provides a pull-up voltage to the terminal microphone terminal 171 and recognizes insertion of the earphone device 200 as normal regardless of injection of the foreign substance 20 according to a change in a voltage of the Ear_Jack_Remote Key_Interrupt. The earphone connection interface 170 detects a voltage change when the earphone is removed through a disposition of the third comparator 330 for detection of earphone removal and controls to perform a terminal operation according to the change.

In the foregoing description, only insertion and operation of the 4-way earphone has been described, but the present invention is not limited thereto. This is, even if a 3-way earphone is inserted, the earphone connection interface 170 normally operates regardless of injection of the foreign substance 20. The 3-way earphone is designed so that an earphone microphone terminal is separately provided and an earphone microphone terminal area is included in an earphone ground terminal.

Figure 6:
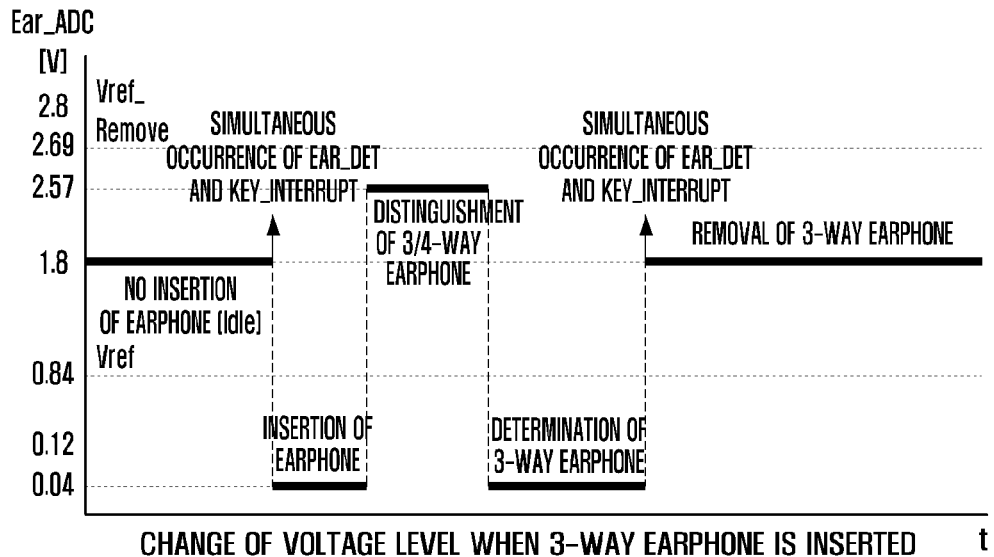
FIG. 6 is a graph illustrating detection of a change value according to a 3-way earphone connection before and after a foreign substance is injected according to an exemplary embodiment of the present invention.
Figure 6:
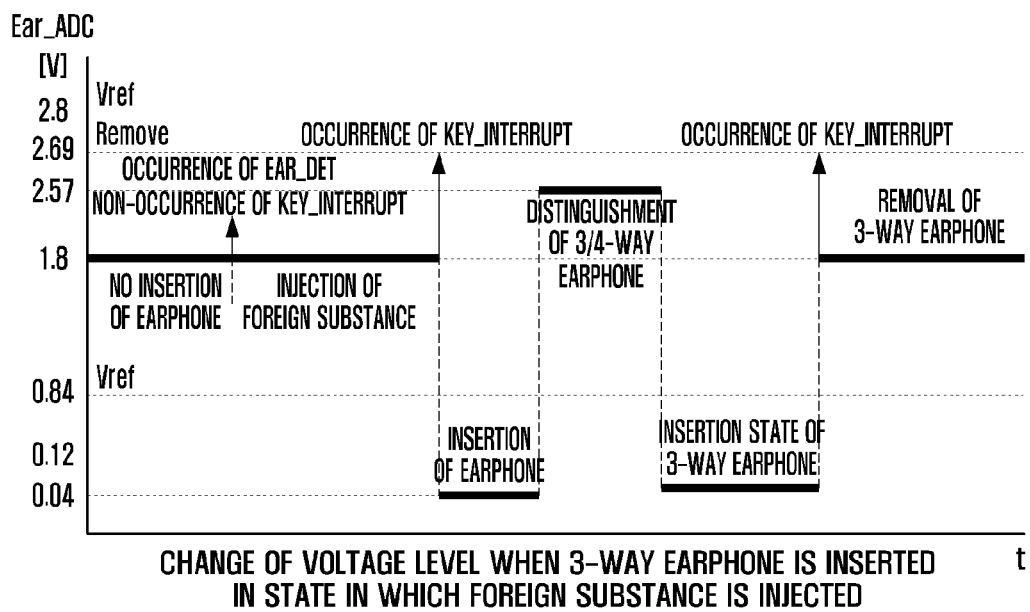

FIG. 6 is a graph illustrating detection of change value according to connection of a 3-way earphone in a state before and after a foreign substance is injected according to an exemplary embodiment of the present invention.

Referring to FIG. 6, in a state in which a foreign substance is not injected, a change before and after connection of the 3-way earphone device of the earphone connection interface 170 may be the same as a change of a first graph. In more detail, at an Ear_ADC port connected to the terminal microphone terminal 171 of the earphone connection interface 170, a voltage of 1.8V is detected before insertion of the 3-way earphone device by a pull-up voltage in which the second pull-up resistor R2 is disposed. Thereafter, when the 3-way earphone device is inserted into the earphone connection interface 170, the terminal microphone terminal 171 is connected to an earphone ground terminal of the 3-way earphone device. Therefore, at the Ear_ADC port, a minimum voltage, for example 0.04V may be detected. In this case, the microphone support circuit 300 may detect that a voltage state change of the EAR_Det and the Ear_Jack_Remote Key_Interrupt simultaneously occurs. In order to determine the number of poles of the connected earphone device, the terminal 100 supplies a voltage of the Ear_Mic_Bias. Accordingly, a voltage of the Ear_Mic_Bias is formed at the Ear_ADC port and thus 2.57V may be detected. Thereafter, the controller 160 determines connection of the 3-way earphone device and intercepts a voltage of the Ear_Mic_Bias, and thus a minimum voltage i.e., 0.04V is detected according to connection of a ground terminal at the Ear_ADC port.

When the 3-way earphone device is removed from the earphone connection interface 170, a pull-up voltage is again supplied to the terminal microphone terminal 171 and thus a potential of 1.8V is formed at the Ear_ADC port. In this case, a voltage state change of the EAR_Det and the Ear_Jack_Remote Key_Interrupt simultaneously occurs. The controller 160 determines release of insertion of the 3-way earphone device based on a voltage state simultaneous change of the ports.

In a state in which a foreign substance is injected, when the 3-way earphone device is inserted, a signal change of a second graph of FIG. 6 may occur. That is, in a state in which a foreign substance is injected, the 3-way earphone device may have a change of a state in which a foreign substance is not substantially injected. More particularly, in a state in which the earphone is not inserted, even if a foreign substance is injected, a voltage state is changed at the EAR_Det of the microphone support circuit 300, but a voltage state of the Ear_Jack_Remote Key_Interrupt is not changed. When the 3-way earphone device is inserted into the earphone connection interface 170, a voltage change occurs at the Ear_Jack_Remote Key_Interrupt. Such a voltage change may occur when connection of the earphone connection interface 170 of the 3-way earphone device is released. Accordingly, the controller of the terminal 100 determines connection release of the 3-way earphone device through a voltage change of the Ear_Jack_Remote Key_Interrupt and controls to perform a function according to the release. As described above, the terminal 100 having the earphone connection interface 170 normally proceeds with connection of the 3-way earphone device regardless of injection of a foreign substance.

In a foregoing description, a predetermined voltage numerical value has been described, but the present invention is not limited to a voltage of the specific numerical value. That is, the respective voltage numerical values may be changed according to a voltage change of an ear microphone bias voltage source or a pull-up voltage applied on the terminal basis. Further, a reference voltage of each comparator may be also changed according to a performance of the comparator.

Figure 7:
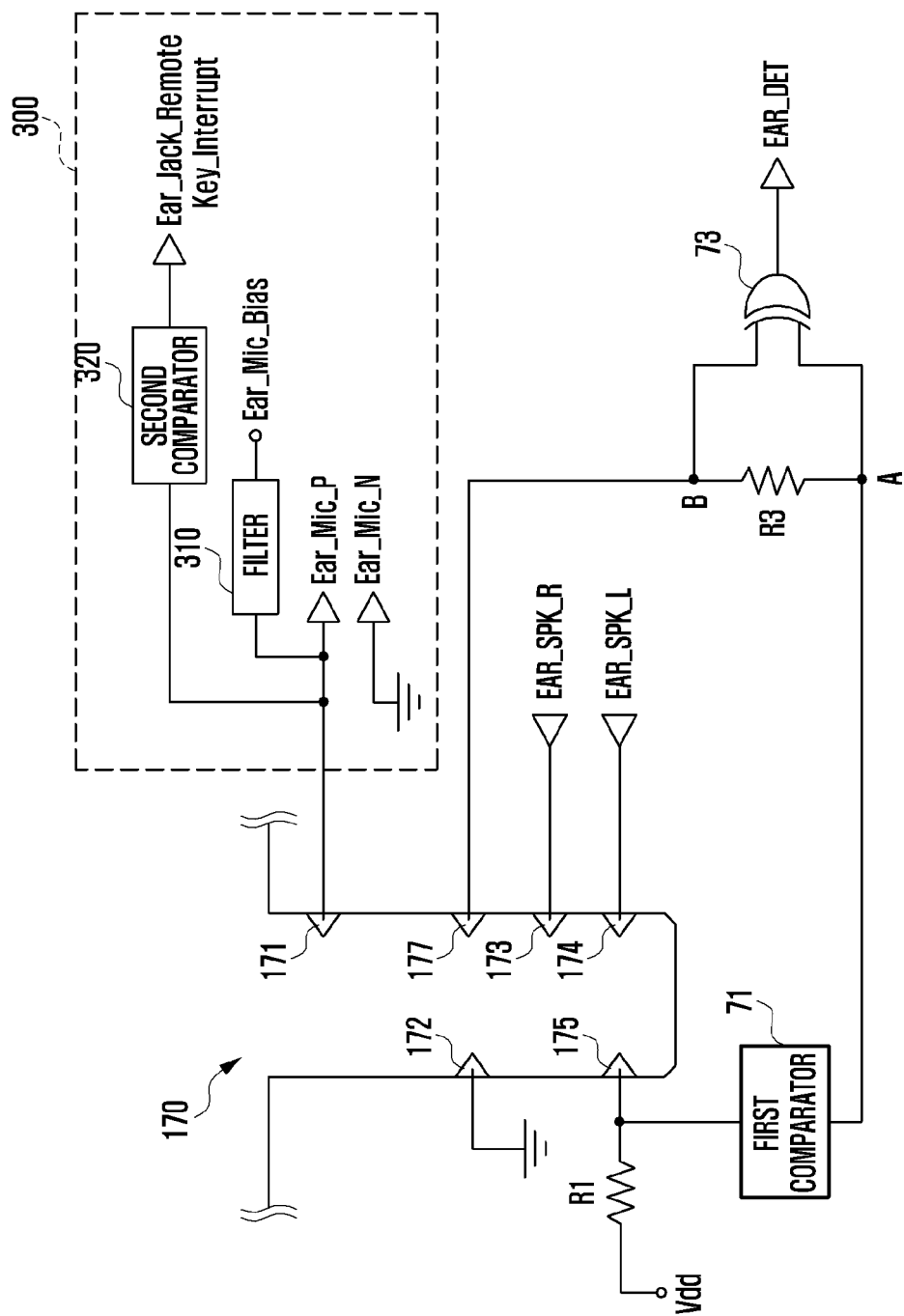
FIG. 7 is a circuit diagram illustrating an earphone connection interface according to a second exemplary embodiment of the present invention.

FIG. 7 is a circuit diagram illustrating an earphone connection interface according to a second exemplary embodiment of the present invention.

Referring to FIG. 7, the earphone connection interface 170 includes the terminal microphone terminal 171, the terminal ground terminal 172, the terminal right terminal 173, the terminal left terminal 174, the earphone detection terminal 175, and the terminal ground detection terminal 177 aligned at the same line as that of the terminal ground terminal 172.

The earphone detection terminal 175 is aligned with the terminal left terminal 174. Accordingly, when the earphone device 200 is inserted into the earphone connection interface 170, the earphone detection terminal 175 and the terminal left terminal 174 each contact with the earphone left terminal 214 of the earphone device 200. A pull-up voltage to which a first pull-up resistor R1 is connected is supplied to the earphone detection terminal 175, and such a pull-up voltage becomes an input voltage of the first comparator 71. Accordingly, when the earphone left terminal 214 contacts with the earphone detection terminal 175, an input voltage of the first comparator 71 is changed and thus an output of the first comparator 71 is changed.

The terminal microphone terminal 171 is connected to the controller 160 through the microphone support circuit 300, and when the terminal microphone terminal 171 is connected to the earphone microphone terminal 211, the terminal microphone terminal 171 transmits and receives a signal for supporting an ear microphone function. The microphone support circuit 300 includes an Ear_Mic_P port and an Ear_Mic_N port connected to the terminal microphone terminal 171, the filter 310 connected between the terminal microphone terminal 171 and the Ear_Mic_Bias, and the second comparator 320 disposed between the terminal microphone terminal 171 and the Ear_Jack_Remote Key_Interrupt.

The terminal left terminal 174 is connected to an EAR_SPK_L of the controller 160, the terminal right terminal 173 is connected to the EAR_SPK_R of the controller 160. When the controller 160 recognizes insertion of the earphone device 200, the controller 160 outputs an audio signal to the terminal left terminal 174, and the audio signal is transferred to the earphone left terminal 214 connected to the terminal left terminal 174. Further, when the controller 160 recognizes insertion of the earphone device 200, the controller 160 outputs an audio signal to the terminal right terminal 173, and the audio signal may be transferred to the earphone right terminal 213 connected to the terminal right terminal 173.

More particularly, the earphone connection interface 170 further includes a separately provided terminal ground detection terminal 177, and the terminal ground detection terminal 177 is connected to the EAR_Det through a gate 73. The terminal ground detection terminal 177 is connected to the EAR_Det through the gate 73 or an output of the first comparator 71. Here, the gate 73 transfers a signal of a specific voltage level to the EAR_Det according to a magnitude of a voltage formed in the terminal ground detection terminal 177 and an output of the first comparator 71 that is input as an eXclusive OR (XOR) gate.

A gate output of points A and B disposed as an input terminal of the gate 73 is shown in Table 1. Here, the third resistor R3 is disposed between the points A and B.

TABLE 1

| A | B | Earphone recognition | State |
|---|---|---|---|
| 0 | 0 | 0 | No insertion |
| 0 | 1 | X | Does not occur |
| 1 | 0 | 1 | earphone device is inserted |
| 1 | 1 | 0 | foreign substance is injected |

In Table 1, in more detail, when the earphone device 200 is not inserted into the earphone connection interface 170 and the foreign substance 20 is not inserted into the earphone connection interface 170, points A and B may have a value "0" as a logic value according to a value of a low state. For this, when the earphone device 200 or the foreign substance 20 is not injected, the first comparator 71 is designed to output a low signal.

When the foreign substance 20 is injected, the earphone detection terminal 175 and the terminal left terminal 174 are connected and thus a pull-up voltage passes through a path including the earphone detection terminal 175, the foreign substance 20, and the terminal left terminal 174. Therefore, an input voltage of the first comparator 71 is changed, and the first comparator 71 may produce an output i.e., outputs a high signal that is different from a previous case according to such a change. The high signal enables a voltage of a point A to have a value "1" as a logic value.

Because the earphone device 200 is not actually inserted into the earphone connection interface 170, the terminal ground detection terminal 177 is in an open state or a floating state and thus the point B follows a voltage value of the point A and has a logic value "1". Therefore, the entire input terminal of the gate 73 have a value "1", and thus an output of the gate 73 has a value "0". When the logic value "0" is transferred, the earphone detection terminal 175 determines as a state in which the earphone device is not inserted or a state in which the foreign substance 20 is injected and does not support an earphone function.

When the earphone device 200 is connected to the earphone connection interface 170, an output of the first comparator 71 is changed, and the terminal ground detection terminal 177 is connected to the terminal ground terminal 172 to have a ground state. Finally, the point B connected to the terminal ground detection terminal 177 is in a low state by the ground and thus a signal of logic values "1" and "0" is input to an input terminal of the gate 73. An output of the gate 73 outputs a value of "1" according to a logic value formed in the input terminal, and when a signal corresponding to "1" is transferred to the EAR_Det, the controller 160 recognizes this as insertion of the earphone device 200 and performs an earphone function.

As described above, by disposing the terminal ground detection terminal 177 and the gate 73 at the earphone connection interface 170, the earphone operation system 10 recognizes a state in which the foreign substance 20 is injected as a state in which the earphone device 200 is not inserted and performs a function according to the state.

As described above, as a disposition of terminals disposed at the earphone connection interface 170, a position of a terminal microphone terminal and a terminal ground terminal may be changed according to a sale region. That is, the earphone connection interface 170 may be designed so that a terminal microphone terminal is disposed at a position adjacent to a terminal right terminal rather than a terminal ground terminal. Further, in the earphone connection interface 170, the terminal ground terminal may be disposed at a position adjacent to the terminal right terminal rather than the terminal microphone terminal. Accordingly, in the earphone connection interface 170, a position of the terminal ground detection terminal 177 may be differently designed according to a position change of the terminal ground terminal. Therefore, the present invention is not limited to a position change of the terminal ground detection terminal 177 and a terminal that can recognize connection of the earphone device may be additionally provided at a position separated by a predetermined distance from the bottom of a hole of the earphone connection interface 170 in which an electrical connection may be formed due to injection of a foreign substance. Alternatively, a normal operation of an earphone device may be supported through a signal change of terminals of the terminal at a position separated by a predetermined distance from the bottom of a hole without addition of a separate terminal.

Figure 8:
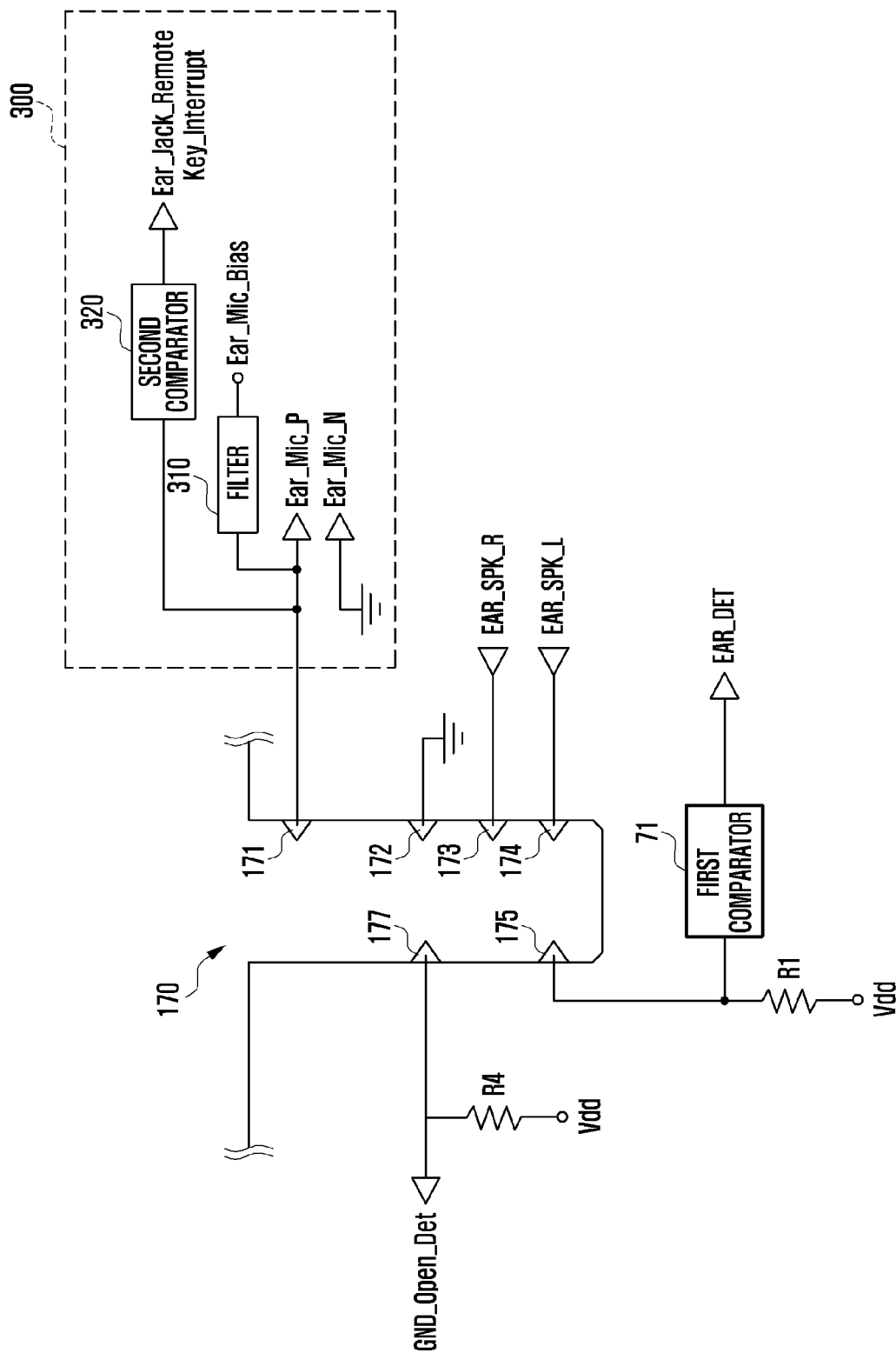
FIG. 8 is a circuit diagram illustrating an earphone connection interface according to a third exemplary embodiment of the present invention.
Figure 9:
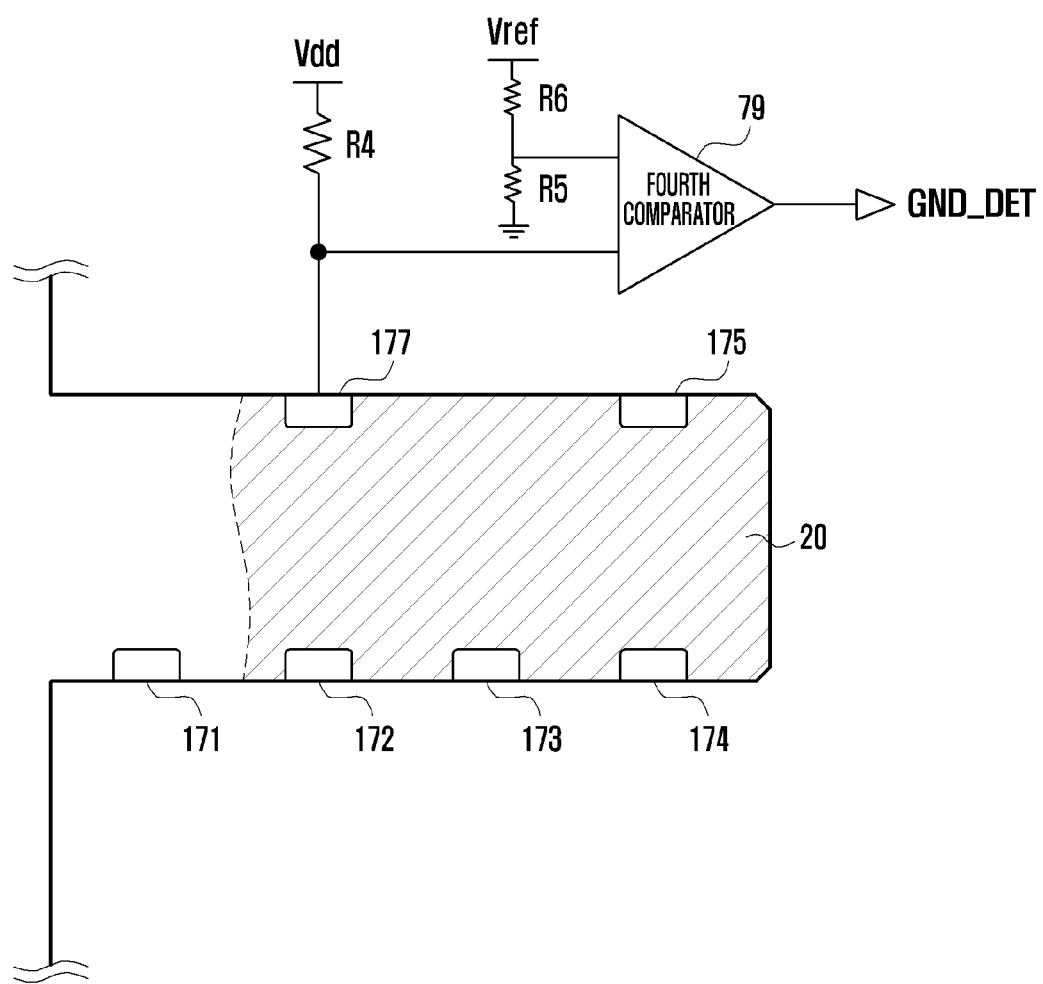
FIG. 9 is a circuit diagram illustrating an earphone connection interface for distinguishing entire filling of a foreign substance according to an exemplary embodiment of the present invention.

FIG. 8 is a circuit diagram illustrating an earphone connection interface according to a third exemplary embodiment of the present invention. FIG. 9 is a circuit diagram illustrating an earphone connection interface for distinguishing entire filling of a foreign substance according to an exemplary embodiment of the present invention.

Referring to FIG. 8, the earphone connection interface 170 includes the terminal microphone terminal 171, the terminal ground terminal 172, the terminal right terminal 173, the terminal left terminal 174, the earphone detection terminal 175, and the terminal ground detection terminal 177 aligned with the terminal ground terminal 172.

The terminal microphone terminal 171 is connected to the controller 160 through the microphone support circuit 300 described in FIG. 6. The terminal microphone terminal 171 performs a passage function of transmitting and receiving a signal for performing a microphone function according to the control of the controller 160. The terminal right terminal 173 is connected to the EAR_SPK_R of the controller 160, and the terminal left terminal 174 is connected to an EAR_SPK_L of the controller 160.

The earphone detection terminal 175 provides a pull-up voltage to which the first pull-up resistor R1 is connected and is connected to an input terminal of the first comparator 71. An output of the first comparator 71 is transferred to the EAR_Det.

A pull-up voltage is provided to the terminal ground detection terminal 177 through a third pull-up resistor R4. The terminal ground detection terminal 177 is connected to a ground terminal detection port GND_Open_Det of the controller 160. Accordingly, when the earphone device 200 is inserted into the terminal ground detection terminal 177, a voltage change occurs in the GND_Open_Det, and the controller 160 determines insertion of the earphone device 200 by determining the GND_Open_Det. A detection of an earphone device of the earphone connection interface 170 according to the third exemplary embodiment is shown in Table 2.

earphone function is supported through accurate recognition according to insertion of the earphone device 200.

Referring to FIG. 9, the foreign substance 20 may be filled in a predetermined portion or more of the earphone connection interface 170. In this case, it may be difficult to apply a circuit applied to the foregoing various exemplary embodiments. That is, the terminal ground detection terminal 177 may not perform a normal operation according to injection of the foreign substance 20. In order to address this, the earphone connection interface 170 may further provide a fourth comparator 79 and distribution resistors R5 and R6 for distributing a predetermined voltage Vdd used as a comparison voltage of the fourth comparator 79, as shown in FIG. 9. Therefore, a voltage between the terminal ground detection terminal 177 and the third pull-up resistor R4 is used as a first input value, and an output of the fourth comparator 79 is determined through comparison of a comparison voltage that distributes a predetermined voltage Vdd by the distribution resistors R5 and R6. The output of the fourth comparator 79 is transferred to a GND_DET port of the controller 160. Here, the GND_DET port is the same port as that of the GND_OPEN_DET port described in the foregoing exemplary embodiments and has a different name in the present exemplary embodiment.

When the foreign substance 20 is filled in the earphone connection interface 170, the foreign substance 20 operates as predetermined resistance of the terminal ground detection terminal 177. Here, the foreign substance 20 may have different resistance values according to a characteristic thereof. For example, water of a water service may have a resistance value of 180 KΩ, and seawater or salt water may have a resistance value of 20 KΩ. Therefore, a first input value of the fourth comparator 79 may be changed to a distribution voltage by the foreign substance 20 in a previous pull-up voltage Vdd state. The fourth comparator 79 compares a first input value and a comparison voltage, and if the first input value is larger than the comparison voltage, the fourth comparator 79 may maintain the same output as that of a previous output signal, and if the first input value is smaller than the comparison voltage, the fourth comparator 79 outputs an output signal different from a previous output signal. When the earphone plug 210 is inserted into the earphone connection interface 170, a potential of the terminal ground detection terminal 177 drops to a ground potential and thus a potential of the first input value of the fourth comparator 79 may become a ground potential. When a foreign substance is inserted into the earphone connection interface 170, a potential of the first input value of the fourth comparator 79 is formed greater than a ground potential. Accordingly, a resistance value of the distribution resistors R5 and R6 may be determined so that a comparison voltage of the fourth comparator 79 becomes a predetermined voltage greater than a ground potential and lower than a pull-up voltage Vdd. Because the distribution resistors R5 and R6

TABLE 2

| GND_Open_DET | High | Low | High | Low | High |
|---|---|---|---|---|---|
| EAR_Det | High | Low | High | High | Low |
| Distinguish insertion of earphone device | non-recognition | recognition | non-recognition | non-recognition | non-recognition |

As shown in Table 2, by determining insertion of the earphone device 200 through a voltage change of the earphone detection terminal 175 and the terminal ground detection terminal 177, an erroneous operation according to injection of the foreign substance 20 is prevented, and an may be changed according to a magnitude of a predetermined voltage, the distribution resistors R5 and R6 may be changed according to a characteristic of each earphone connection interface 170.

As described above, even if the foreign substance 20 is injected, a structure of the earphone connection interface 170 is formed to distinguish from insertion of an earphone plug through signal transfer of an appropriate form.

Figure 10:
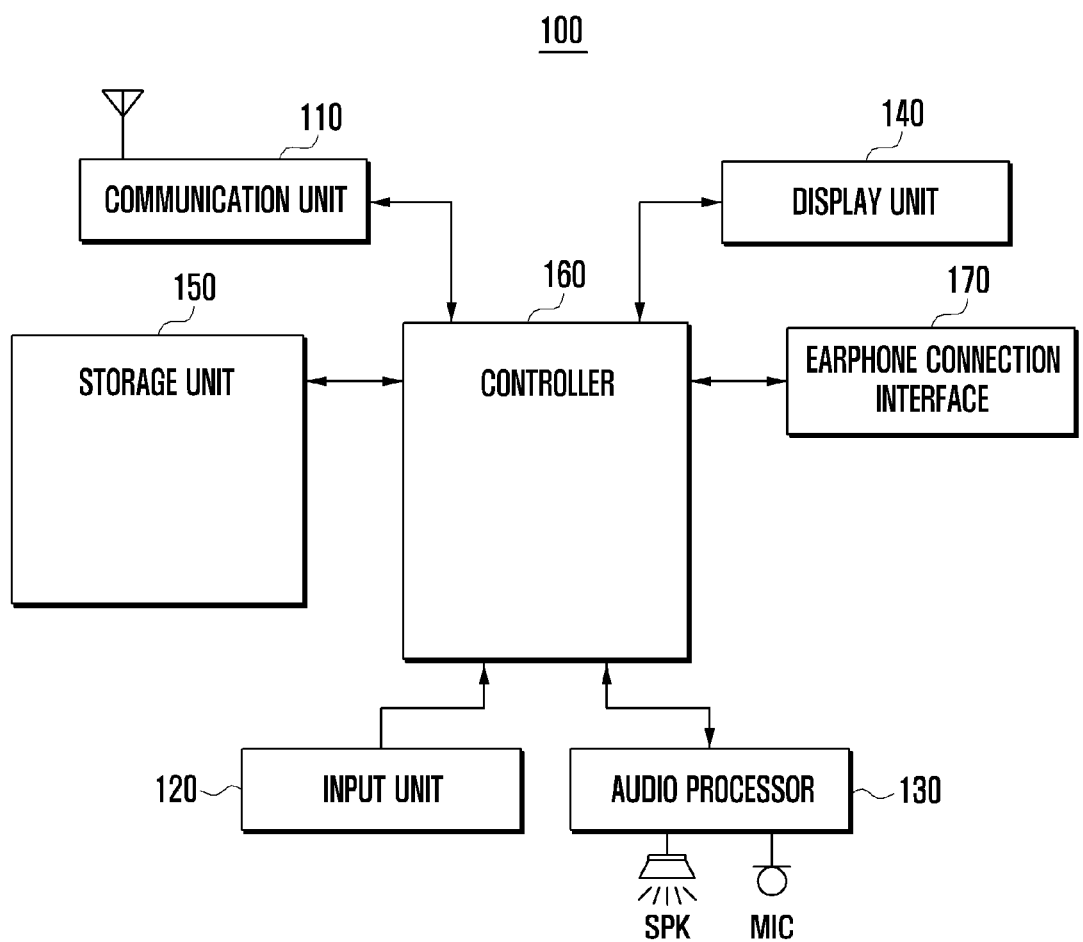
FIG. 10 is a block diagram illustrating a configuration of a terminal according to an exemplary embodiment of the present invention.

FIG. 10 is a block diagram illustrating a configuration of a terminal according to an exemplary embodiment of the present invention.

Referring to FIG. 10, the terminal 100 includes a communication unit 110, an input unit 120, an audio processor 130, a display unit 140, a storage unit 150, a controller 160, and an earphone connection interface 170 for inserting the earphone device 200. Here, when the terminal 100 does not support a communication function, the communication unit 110 may be omitted. The input unit 120 is used for performing an input action to the terminal 100 and may be provided in a form of a button, a key, a side key, and the like. Here, when the display unit 140 is provided in a touch screen form, the display unit 140 may perform a function of an input unit.

When the earphone device 200 is connected to the earphone connection interface 170, the terminal 100 recognizes insertion of the corresponding earphone device 200 and performs a function related to the earphone device 200. In this case, the earphone connection interface 170 provides two detectors for detecting insertion of an earphone. That is, as described above, the earphone connection interface 170 may provide a first detector corresponding to the earphone detection terminal 175 and a second detector including circuits provided in the terminal microphone terminal 171 or may provide a second detector corresponding to the terminal ground detection terminal 177. Therefore, the controller 160 determines a voltage change state of the first detector and the second detector and determines whether a present state is a state in which the foreign substance 20 is injected, a state in which the earphone device 200 is inserted, or a state in which the earphone device 200 is inserted in a state in which the foreign substance 20 is injected. If a present state is a state in which the foreign substance 20 is injected, the controller 160 controls not to perform a separate earphone function, and if a present state is a state in which the earphone device 200 is inserted, the controller 160 controls to perform an earphone function. The electrical change of the first detector corresponds to contact state of the first area. And the electrical change of the second detector corresponds to contact state of the second area.

In the foregoing description, the second detector includes a circuit connected to the terminal microphone terminal 171, or a circuit connected to the terminal ground detection terminal 177. However, the present invention is not limited thereto. This is, the second detector may dispose a terminal right detection terminal aligned with the terminal right terminal 173 with a method similar to the terminal ground detection terminal 177 according to a design method. In this case, the second detector may be a terminal right detection terminal and a circuit including the same.

Therefore, in a state in which the earphone device 200 is inserted, the earphone connection interface 170 has at least two detectors, determines a normal insertion state of the earphone device 200 based on a voltage change state of each detector, and performs an earphone function according to the insertion state.

The audio processor 130 includes a speaker (SPK) for outputting an audio signal of the terminal 100 and a microphone (MIC) for collecting an audio signal. When the earphone device 200 is inserted into the earphone connection interface 170, the audio processor 130 controls to turn off a function of the speaker SPK and the microphone MIC and converts an audio signal path to perform a corresponding function based on the earphone device 200. When the earphone device 200 is removed from the earphone connection interface 170 or when the earphone device 200 is in a non-connection state, the audio processor 130 controls to maintain an audio path of an original state or to return to an original state of an audio signal path to turn on a function of the speaker and the microphone of the terminal 100. In this case, the audio processor 130 activates at least one of the speaker and the microphone in which a presently activated user function requests according to the control of the controller 160.

The display unit 140 outputs various screens according to a user function operation of the terminal 100. More particularly, when the earphone device 200 is inserted or the foreign substance 20 is injected into the earphone connection interface 170, the display unit 140 may output respective distinguished alarm. For this, the controller 160 determines a voltage change of the first detector and the second detector, and when a foreign substance 20 is injected into the earphone connection interface 170, the controller 160 controls the display unit 140 to output a pop-up message or a message notifying that a foreign substance 20 is injected into the earphone connection interface 170. The controller 160 controls the display unit 140 to output preset guidance information for removing a foreign substance inserted into the earphone connection interface 170. The display unit 140 may output a guidance message according to insertion or release of the earphone device 200, injection of the foreign substance, removal of the injected foreign substance, and insertion or release of the earphone device in a state in which the foreign substance is injected. Here, the guidance message may include at least one of a text, a specific screen, or a specific icon and may additionally include a voice file to transfer to the audio processor 130. Thereby, a user can recognize in which state the terminal 100 presently operates. In addition, the display unit 140 may variously provide a message or an image about a state in which a foreign substance is injected. That is, the controller 160 may distinguish a state in which a foreign substance 20 is injected in only a portion at which an earphone detection terminal Ear_DET is disposed or a state in which a foreign substance 20 is injected over the entire earphone connection interface 170 based on signal values transferred from the earphone connection interface 170. Accordingly, the display unit 140 may output a message or an image for distinguishing a filling state of the foreign substance 20 (i.e., partial filling or entire filling) according to the control of the controller 160.

When the earphone device 200 is inserted into the earphone connection interface 170, the controller 160 guides recognition of insertion of the earphone device 200 through at least one of the display unit 140 and the audio processor 130. The controller 160 controls the display unit 140 to display a user function list that may be performed through insertion of the earphone device 200. When a specific user function of supporting an audio signal output function is activated, if the earphone device 200 is inserted into the earphone connection interface 170, the controller 160 controls to stop a speaker output of an audio signal through the speaker of the audio processor 130 and to output a corresponding audio signal through the earphone device 200.

FIG. 11 is a flowchart illustrating a method of operating an earphone according to an exemplary embodiment of the present invention. Hereinafter, in the earphone operation system, in order to recognize a connection of an earphone device, some of terminals of the terminal disposed at the earphone connection interface described in the foregoing description are referred to as a first detector and a second detector.

Referring to FIG. 11, when power is supplied, the controller 160 of the terminal 100 distributes power that is necessary for constituent elements of the terminal 100 and maintains a standby state in order to support a user function in step 901. In this case, when a signal for activating a specific user function is input from the input unit 120 or the display unit 140 of an input function, the controller 160 activates a user function according to the input signal.

The controller 160 determines whether the first detector provided in the earphone connection interface 170 in order to recognize connection of the earphone device 200 has a first setting value in step 903.

If the first detector does not have a first setting value, the controller 160 determines whether a signal for terminating the terminal is input in step 905.

If a signal for terminating the terminal is not input, the process returns to step 901 and the controller 160 controls to perform a standby state or a specific user function operation state. Here, the first detector may be the earphone detection terminal 175 and a circuit connected to the same. The first setting value may be a specific voltage level according to a change of a voltage provided at the first detector. Therefore, when the first detector has a first setting value, a pull-up voltage provided to the earphone detection terminal 175 is changed according to injection of the foreign substance 20.

On the other hand, if it is determined that a first detector has a first setting value at step 903, the controller 160 determines whether a second detector has a second setting value in step 907. Here, the second detector may be the terminal microphone terminal 171 and a circuit connected to the same and the terminal ground detection terminal 177 and a circuit connected to the same described above in various exemplary embodiments. Further, when a terminal right detection terminal is provided instead of the terminal ground detection terminal 177 by a designer's intention, the second detector may be a terminal right side detection terminal. That the second detector has a second setting value means that a voltage provided to the second detector is changed to a specific voltage level. That is, a voltage provided to the second detector is changed according to insertion of the earphone device 200.

If the second detector does not have a second setting value at step 907, the controller 160 determines that the foreign substance 20 is injected in step 911. In this case, the controller 160 may output a guidance message according to injection of the foreign substance 20 through at least one of the display unit 140 and the audio processor 130.

If the second detector has a second setting value at step 907 (i.e., if the second detector has a predetermined voltage level according to insertion of the earphone device 200), the controller 160 recognizes the earphone device 200 and performs a function according to connection of the earphone device 200 in step 909. That is, the controller 160 converts an audio path to output an audio signal generated in the terminal 100 through the earphone device 200 according to connection of the earphone device 200, and when the earphone device 200 is a 4-way earphone device, the controller 160 controls to collect and process a microphone signal. Even if a foreign substance is injected, by detecting an electrical chance of detectors, when the earphone device 200 is in a non-connection state, the controller 160 controls to maintain an audio path corresponding to an output of an audio signal through the terminal 100.

In order to determine a setting value according to a change of a voltage level of the first detector and the second detector, the controller 160 may provide a port connected to each detector.

As described above, in an earphone connection interface of an earphone operation system, a method of operating an earphone, and a terminal for supporting the same according to an exemplary embodiment of the present invention, even if a foreign substance is injected or otherwise received into an earphone connection interface, the earphone connection interface can normally recognize an earphone device and normally perform a function based on the earphone device. For this, exemplary embodiments of the present invention include a first detector disposed at a first area of the bottom of the earphone connection interface to detect an electrical change and a second detector disposed at a second area of a position separated by a predetermined gap from the bottom to detect an electrical change according to earphone connection.

The terminal may further include various additional modules according to a providing form. This is, when the terminal is a communication terminal, it may further include constituent elements such as a short range communication module for short range communication, an interface for transmitting data by a wired communication method or a wireless communication method of the terminal, an Internet communication module for performing an Internet function by communicating with an Internet network, and a digital broadcasting module for performing a digital broadcasting reception and reproduction function. Further, a specific constituent element may be excluded from the above constituent elements or replaced with another constituent element according to a providing form of the terminal.

Further, the terminal according to an exemplary embodiment of the present invention may include information and communication devices and multimedia devices such as a Portable Multimedia Player (PMP), a digital broadcasting player, a Personal Digital Assistant (PDA), music player (e.g., MP3 player), a mobile game terminal, a smart phone, a laptop computer, a hand-held PC, as well as mobile communication terminals operating by communication protocols corresponding to various communication systems and application devices thereof.

As described above, in an earphone connection interface and a terminal for supporting the same according to exemplary embodiments of the present invention, even if a foreign substance is injected or otherwise received into the earphone connection interface, a connection of an earphone device can be normally recognized and thus the earphone device and the terminal can be normally operated and a method of operating an earphone can be normally performed.

While the invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. An earphone connection interface, the earphone connection interface comprising:
a first detector disposed at a first area to detect an electrical change according to a contact state of the first area; and
a second detector disposed at a second area different from the first area, the second detector being configured to detect an electrical change according to a contact state of the second area,
wherein the earphone connection interface is configured to determine:

a connection or a non-connection of an earphone plug, and an extent to which a foreign substance fills the earphone plug, the extent including one of completely filled or partially filled, and wherein the determining is based on the electrical change according to the contact state of the first area, and the electrical change according to the contact state of the second area.

2. The earphone connection interface of claim 1, wherein the first detector comprises an earphone detection terminal formed at a bottom of an inside of the earphone connection interface, the earphone connection terminal being configured to contact with an earphone left terminal of the earphone plug when the earphone plug is inserted, and wherein the second detector comprises at least one of:
   a ground detection terminal configured to contact with a terminal microphone terminal, and
   an earphone ground terminal of the earphone plug.

3. A mobile terminal device comprising:

an earphone connection interface in which at least two terminals are configured to detect an electrical change according to a contact state and are disposed; and at least one processor configured to:
   perform a first function support according to an extent to which a foreign substance fills the earphone connection interface, the extent including one of completely filled or partially filled, and
   perform a second function support according to a non-connection of the earphone plug, wherein the performing of the first and second functions is by detecting the electrical change of the contact state of each of the at least two terminals of the earphone connection interface.

4. The device of claim 3, wherein the earphone connection interface comprises:

a microphone terminal protruded from an inner wall of a groove, configured to contact an earphone plug;

a ground terminal configured to contact with an earphone ground terminal of the earphone plug;

a right terminal configured to contact with an earphone right terminal of the earphone plug;

a left terminal configured to contact with an earphone left terminal of the earphone plug;

an earphone detection terminal configured to contact with the earphone left terminal of the earphone plug;

a first pull-up resistor contacted to the earphone detection terminal and a pull-up voltage, the pull-up voltage being provided to the earphone detection terminal through the first pull-up resistor;

a first comparator configured to use the earphone detection terminal as an input voltage; and a microphone support circuit comprising:
   a second pull-up resistor connected to the microphone terminal, and
   a pull-up voltage provided to the microphone terminal through the second pull-up resistor.

5. The device of claim 4, wherein the microphone support circuit further comprises:

a second comparator connected to the microphone terminal configured to:
   detect a first voltage change according to key pressing of a microphone module provided to the earphone device as an input voltage, and
   output a first predetermined signal according to the first voltage change;

an ear microphone bias voltage source configured to supply a voltage for operating the microphone module, and a third comparator configured to output a second predetermined signal according to a second voltage change occurring in a process of inserting or removing the earphone device.

6. The device of claim 5, wherein the at least one processor is further configured to stop voltage from the ear microphone bias voltage source supplied to the microphone terminal, according to the second predetermined signal.

7. The device of claim 3, wherein the earphone connection interface comprises:

a microphone terminal, a ground terminal, a right terminal, and a left terminal, protruded from an inner wall of a groove;

an earphone detection terminal disposed at a bottom of the groove of the earphone device to detect an electrical change according to a contact state;

a ground detection terminal separated by a predetermined gap from the earphone detection terminal and disposed at the groove inner wall for detecting an electrical change according to connection of the earphone device;

a first pull-up resistor connected to the earphone detection terminal and a pull-up voltage provided to the earphone detection terminal through the first pull-up resistor; and a third pull-up resistor connected to the ground detection terminal and a pull-up voltage provided to the earphone detection terminal through the third pull-up resistor.

8. The device of claim 7, wherein the at least one processor comprises:
   a ground detection port connected to the ground detection terminal; and
   an earphone detection port connected to the earphone detection terminal, and wherein the at least one processor is further configured to:
   control to convert an audio path according to connection of the earphone device, or
   maintain an audio path according to the non-connection of the earphone device according to a voltage level formed in the ground detection port and the earphone detection port.

9. The device of claim 7, further comprising:

a pull-up resistor connected to the ground detection terminal for providing a pull-up voltage; and a comparator using a voltage formed in the pull-up resistor as an input value and having a predetermined comparison voltage, wherein the at least one processor is further configured to:
   recognize that the earphone plug is inserted and supports an earphone function if the input value is smaller than a comparison voltage, and
   recognize that a foreign substance is inserted and support a function according to insertion of the foreign substance if the input value is greater than a comparison voltage and lower than the pull-up voltage.

10. The device of claim 3, wherein the earphone connection interface comprises:

a microphone terminal, a ground terminal, a right terminal, and a left terminal protruded from an inner wall of a groove;

an earphone detection terminal disposed at a bottom of the groove of the earphone device to detect an electrical change according to a contact state;

a ground detection terminal disposed at the groove inner wall separated by a predetermined gap from the earphone detection terminal for detecting an electrical change according to connection of the earphone device;
a first pull-up resistor connected to the earphone detection terminal and a pull-up voltage provided to the earphone detection terminal through the first pull-up resistor; and
a gate using a voltage formed in the ground detection terminal and a voltage formed in the earphone detection terminal as an input voltage.

11. The device of claim 3,
wherein the earphone connection interface comprises:
a microphone terminal protruded from an inner wall of a groove and configured to contact an earphone plug,
a ground terminal configured to contact an earphone ground terminal of the earphone plug,
a right terminal configured to contact an earphone right terminal of the earphone plug,
a left terminal configured to contact an earphone left terminal of the earphone plug, and an earphone detection terminal configured to contact the earphone left terminal of the earphone plug,
a first pull-up resistor configured to contact the earphone detection terminal,
a pull-up voltage provided to the earphone detection terminal through the first pull-up resistor, and
a first comparator configured to use the earphone detection terminal as an input voltage, and
wherein the at least one processor is further configured to:
perform a function according to insertion of the earphone device when both:
a voltage state of an earphone detection port connected to the earphone detection terminal is changed, and
a microphone terminal forming voltage level is smaller than a voltage of an ear microphone bias voltage source, the ear microphone bias voltage source being provided to operate a microphone module of the earphone device, and
perform a function according to non-insertion of the earphone device when a microphone terminal forming voltage level is equal to the voltage of the ear microphone bias voltage source.

12. The device of claim 11, wherein the at least one processor is further configured to determine whether the earphone device is inserted according to an output of the gate.

13. The device of claim 12, wherein the at least one processor is further configured to:
recognize as release or insertion of the earphone device when the voltage state of the earphone detection port is changed after insertion of the earphone device, and
recognize a case where:
the earphone device is removed after the earphone device is inserted in a state in which the foreign substance is in the earphone connection interface, and
a microphone terminal forming voltage level is equal to a voltage of the ear microphone bias voltage source while a voltage state of the earphone detection port is maintained.

14. The device of claim 3, further comprising a display configured to output a guidance message and an image in response to detecting at least one event, the at least one event including:
an insertion or a release of the earphone device,
an entry of the foreign substance into the earphone connection interface,
a filling state of the foreign substance,
a removal of the foreign substance, or
the insertion or release of the earphone device in a state in which the foreign substance has entered into the earphone connection interface,
wherein the detecting of the at least one event is based on an electrical signal change of the at least two terminals.

15. A method of operating an earphone, the method comprising:
preparing an earphone connection interface comprising:
a first detector disposed at a first area, the first detector being configured to detect an electrical change according to a contact state, and
a second detector disposed at a second area different from the first area, the second detector being configured to detect an electrical change occurring when an earphone plug is inserted;
determining:
a connection or a non-connection of the earphone plug, and
an extent to which a foreign substance fills the earphone plug, the extent including one of completely filled or partially filled, the determining being based on a signal change of the first detector and a signal change of the second detector; and
performing a first function according to the connection of the earphone plug and performing a second function according to the non-connection of the earphone plug.

16. The method of claim 15, wherein the determining of the connection or the non-connection of the earphone plug comprises:
performing, when a voltage level formed in the first detection is changed and a voltage level formed in the second detection is maintained, the second function according to the non-connection of the earphone plug; and
performing, when a voltage level formed in the first detector and a voltage level formed in the second detector are changed, the first function according to the connection of the earphone plug.

17. The method of claim 16, wherein the determining of the connection or the non-connection of the earphone plug comprises performing the first function according to the connection of the earphone plug when a voltage level formed in the first detector is changed, and a voltage level formed in the second detector is changed.

18. The method of claim 15, further comprising:
determining the non-connection of the earphone plug according to the signal change of the first detector and the signal change of the second detector, while in a state in which the earphone plug is inserted; and
deactivating the first function according to the connection of the earphone plug when the earphone plug is released.

19. The method of claim 15, further comprising outputting a guidance message according to at least one state of:
an insertion of the earphone plug;
a release of the earphone plug,
an entry of the foreign substance into the earphone connection interface,
a removal of the foreign substance, or
the insertion or the release of the earphone plug in a state in which the foreign substance has entered into the earphone connection interface,
wherein the at least one state is determined according to the signal change of the first detector and the signal change of the second detector.

20. The method of claim 19, further comprising:

outputting, when a signal change occurs in the first detector and a signal change occurs in the second detector, a guidance message according to the connection or the non-connection of the earphone plug; and outputting, when the signal change occurs in the first detector and the signal change does not occur in the second detector, a guidance message according to the entry of the foreign substance into the earphone connection interface.

* * * * *